United States Patent

[11] 3,610,375

[72] Inventors Warren L. Gilliland
Sepulveda;
Franklin B. Airheart, Granada Hills, both of Calif.
[21] Appl. No. 853,678
[22] Filed Aug. 28, 1969
[45] Patented Oct. 5, 1971
[73] Assignee Airheart Products, Inc.
Van Nuys, Calif.

[54] DISC BRAKE WEAR COMPENSATION
8 Claims, 4 Drawing Figs.
[52] U.S. Cl. .................................................. 188/196 B,
188/71.8, 188/106 F
[51] Int. Cl. ........................................... F16d 65/54,
F16d 55/18
[50] Field of Search .................................... 188/71.8,
106 F, 196 R

[56] References Cited
UNITED STATES PATENTS
| | | | |
|---|---|---|---|
| 1,825,555 | 9/1931 | Stern | 188/196 (R) UX |
| 3,337,008 | 8/1967 | Trachte | 188/106 (F) |
| 3,371,750 | 3/1968 | Schutte et al. | 188/71.8 |
| 3,459,282 | 8/1969 | Hoenick et al. | 188/71.8 X |

Primary Examiner—Duane A. Reger
Attorney—White & Haefliger

ABSTRACT: The invention concerns disc brake lining wear compensation, in which a fluid pressure responsive element, as for example a plunger, urges the brake lining toward the disc, there being load transmitting shoulders carried by the plunger and by auxiliary means to mechanically advance the plunger toward the disc, such shoulders being located for relative shifting in response to predetermined plunger advancement to block retraction of the plunger in such manner as to compensate for brake lining wear.

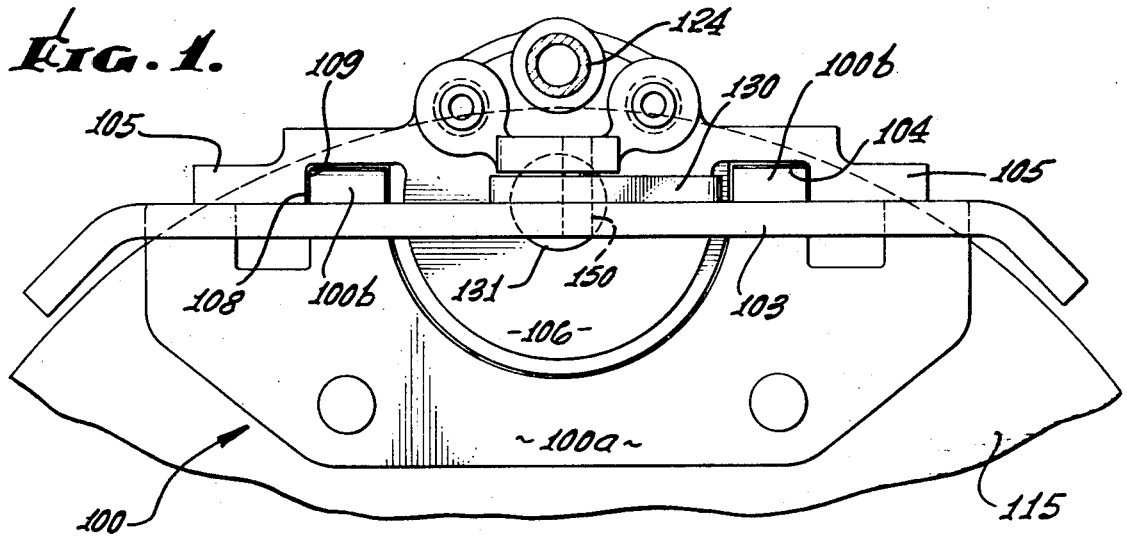
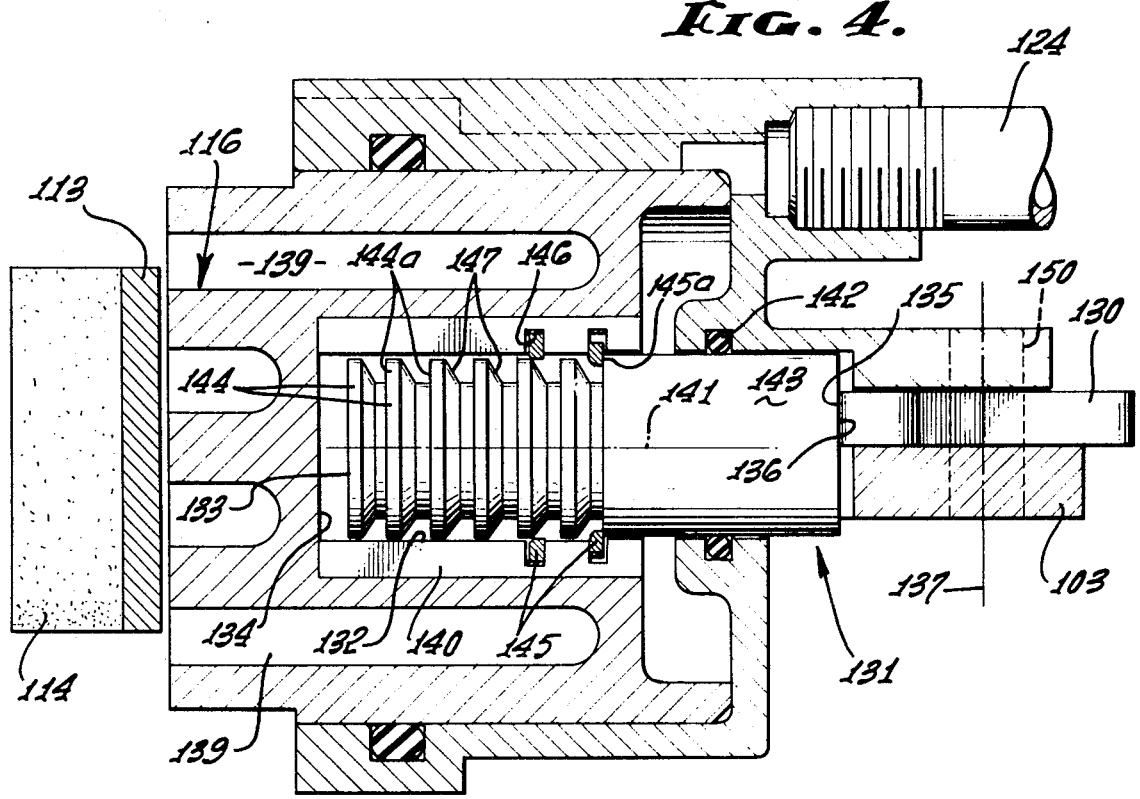

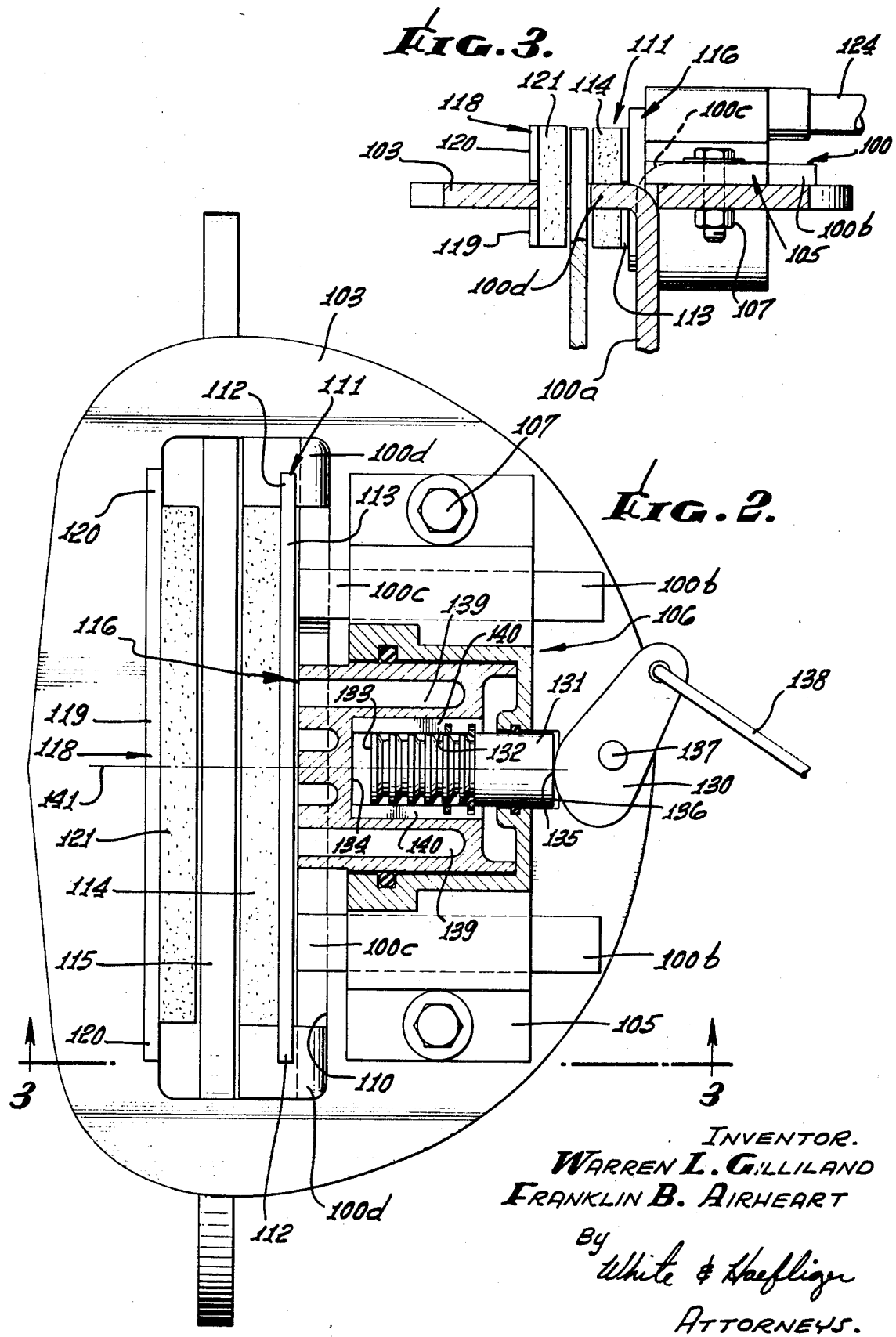

DISC BRAKE WEAR COMPENSATION

BACKGROUND OF THE INVENTION

This invention relates generally to disc brakes, and more particularly concerns disc brake lining wear compensation.

It is desirable in certain disc brake installations to provide for both fluid pressure responsive brake application and auxiliary mechanical application of the brake. Such dual made braking is of advantage, for example, in vehicles where provision for emergency mechanical braking is made in addition to the normal fluid pressure responsive brake application.

Where a fluid pressure responsive plunger is employed to urge the brake lining toward the disc, wear of such lining is not an impediment to fluid pressure operation of the brake, since more fluid is simply displaced into the cylinder to stroke the plunger; however, such wear presents a serious problem as respects auxiliary mechanically effected stroking of the plunger inasmuch as mechanical linkages have limited ranges of movement, and mechanical advantage may tend to lessen with increasing length of the piston stroke to effect braking.

SUMMARY OF THE INVENTION

It is a major object of the invention to provide solutions to the above-described problems, as well as other problems encountered in disc brake design, through the provision of unusually effective means for using the fluid pressure actuation mode of the brake to adjust the auxiliary mechanical force transmitting element or elements in order to compensate for lining wear. Another object of the invention is to provide a disc brake assembly of simple and sturdy construction and featuring both fluid pressure actuation, and auxiliary mechanical actuation, of the brake.

Basically, the invention is embodied in a disc brake assembly that includes, in combination, a. a plunger and cylinder assembly, the plunger being responsive to fluid pressure application to advance relative to the cylinder to transmit actuating force for displacing a brake part into braking engagement with a relatively rotating disc, the brake part (as for example lining) being subject to wear, and b. Auxiliary means to mechanically advance the plunger relative to the cylinder to displace that part into braking engagement with the disc, c. The auxiliary means being operatively connected to the plunger and there being interengageable load transmitting shoulders carried by said means and plunger and located for relative shifting in response to predetermined plunger advancement relative to the auxiliary means, thereby to block retraction of the plunger relative to the auxiliary means so as to compensate for brake part wear.

Typically, the auxiliary means may comprise an actuator and an element carried for movement relative to the plunger to which actuating force is transmissible by the actuator, certain of the shoulders being on the element; the element may have a piston face exposed to receive application of such fluid pressure and so as to urge the element in a retraction direction opposite to that of plunger advancement; and the plunger may be received and the piston face of the element may be within that recess providing extreme compactness. Further, certain of the shoulders may be defined by a series of flanges on one of the element and plunger and spaced in the advancement direction to be successively engaged by a shoulder carried by the other of the element and plunger as brake part wear progresses; there may be at least two of such shoulders (as for example rings) carried by the plunger and spaced in the advancement direction by an amount different from the spacing of the ring engagement shoulders on the element so that such shoulders on the plunger may alternately engage the shoulders (rings) on the plunger providing fineness of incremental adjustment.

The invention finds especial advantage where a carrier plate carries the plunger and cylinder assembly for lateral shifting relative to another plate to equalize wear of the linings on a pair of brake parts dropped into place in an opening in that other plate, as will be seen.

These and other objects and advantages of the invention, as well as the details of an illustrative embodiment, will be more fully understood from the following detailed description of the drawings, in which:

DRAWING DESCRIPTION

FIG. 1 is an elevation showing a disc brake and associated disc;

FIG. 2 is a top plan view of the FIG. 1 structure, the brake cylinder being cut away to show interior construction;

FIG. 3 is a vertical section taken on line 3—3 of FIG. 2; and

FIG. 4 is an enlarged vertical section showing the cylinder, plunger and self-adjustable means to compensate the brake for wear.

DESCRIPTION OF PREFERRED EMBODIMENT

In the drawings, the brake assembly includes support members one of which comprises an L-shaped mounting bracket 100 with vertical plate 100a suitably attached to a support flange, and horizontal plate ears 100b. The other support member comprises a horizontal plate 103 secured to ears 100b (as will be described) so as to be shiftable laterally relative thereto. Such shifting is accommodated by lateral reception of ears 100b in the lateral guide slot 104 formed between plate 103 and L-shaped flanges 105 integral with and projecting from hydraulic pressure cylinder 106 and secured by fasteners 107 to plate 103. Note the outer lateral sides 108 of the ears engaging the inner lateral sides 109 of the flanges 105.

Plate 103 defines an enlarged opening 110 through which the curved connections 100c between ears 100b and plate 100a project, as seen in FIG. 3. In addition, lugs 100d on the bracket project as shown, with longitudinal spacing therebetween in FIG. 2 to define a gap through which one clamping part 111 is dropped into place, that part then extending downwardly through opening 110 in plate 103. Lugs 112 on plate 113 of part 111 seat on bracket lugs 100d and support that clamping part during its lateral shifting movement carrying lining 114 into braking engagement with rotary disc 115. Such movement is effected by a piston or plunger 116 associated with cylinder 106, and engageable with plate 113.

The other clamping part 118 has a plate 119 with integral lugs 120 that seat on plate 103, as seen in FIG. 2. Lining 121 on plate 119 has braking engagement with disc 115 in response to the combined lateral shifting of lining 114 to engage the opposite side of disc 115, and lateral shifting of plate 103 to compensate for wear of the linings, and also tending to equalize such wear. A fluid pressure supply line for the cylinder 106 is seen at 124.

Coming now to that portion of the description with which the invention is more directly concerned, auxiliary means is provided to mechanically advance the plunger 116 relative to the cylinder 106 to displace the brake part (as for example part 111) into clamping or braking engagement with the disc 115. Such means, as for example includes an actuator 130 and element 131, is operatively connected to the plunger 116. Also, interengageable load transmitting shoulders are carried by such auxiliary means and the plunger, with location for relative shifting in response to predetermined plunger advancement relative to such means thereby to block relative retraction of the plunger so as to compensate for brake part wear.

The element 131 may advantageously comprise a subplunger received in a bore or recess 132 in the plunger 116 so that a piston face 133 on the element 131 may be exposed to receive application of fluid pressure applied to the main plunger 116. The arrangement is such that application of fluid pressure to the plunger face 134 tends to drive the plunger forwardly (leftwardly in FIGS. 2 and 4) and simultaneously tends to drive the subplunger element 131 rearwardly (rightwardly in those figures). In this regard, note that the actuator 130 is located to mechanically urge the element 131 in the direction of plunger advancement as the actuator cam surface 135 increasingly bears against the end face 136 of the element 131 in response to clockwise rotation of the actuator 13 about pin axis 137. Such rotation may be effected by a mechanical linkage 138 attached to the actuator and representative of a vehicle hand brake linkage.

It should further be noted that the cylinder 106 may be cored at 139 for reducing its weight, and that a series of grooves 140 adjacent the bore is provided to extend parallel to plunger axis 141 to communicate fluid pressure from line 124 and cylinder chamber 141 to the end faces 133 and 134 previously described. A seal ring 142 seals off between the element cylindrical surface 143 and the cylinder.

In the illustrated embodiment, the interengageable shoulders referred to above may be considered to form a ratchet. Certain of such shoulders may advantageously be defined by a series of flanges 144 on the subplunger element 131 and axially spaced to be peripherally and successively engaged by another shoulder or shoulders carried by the plunger 116 as brake part (i.e. lining) wear progresses. FIGS. 2 and 4 show two such other shoulders defined by split rings 145 constructed to be spring urged inwardly toward the flanges 144 while remaining axially retained in annular grooves 14 formed by the plunger 116 as illustrated.

The axial spacing of the two rings 145 (or flange engaging shoulders 145a thereon) is such as to be different from the spacing of the ring engaging shoulders 144a on the flanges 144, whereby as the subplunger element 131 is displaced to the right relative to the main plunger 116 (in response to fluid pressure application to faces 133 and 134, and as lining wear progresses), alternate rings will engage the flange shoulders 144a in axial load transmitting relation. Note that the flanges are beveled at 147 to expand the rings 145 as the flanges are displaced rightwardly relative to the rings. Such alternate engagement of the first two rings with the flanges as described doubles the ratcheting sensitivity or fineness from what would exist were only one ring employed. Alternatively, the ring spacing may equal the flange spacing for wider distribution of loading. Additional rings may be used, with appropriate spacing, to further enhance the ratcheting sensitivity. Also the rings may be on the subplunger and the flanges on the main plunger.

It should be further pointed out that the compensation of the auxiliary braking via element 131 and actuator 130 as described occurs automatically during fluid pressure application to the main plunger 116 to effect normal braking. As the lining wears, the plunger 116 increases its leftward protrusion from the cylinder 106 in FIG. 4, tending to carry the subplunger element 131 leftwardly with it and away from the actuator 130 which is pinned to the plate 103 at 150; however, the automatic ratcheting action described maintains the subplunger face 136 adjacent the actuator cam face 135 to assure effective auxiliary braking, without reduced mechanical advantage and enhancing the safety factor.

It should finally be observed that the self-compensating mechanism described is itself carried on the plate 03 which shifts laterally relative to the support ears 100b on support plate 100a whose position is fixed relative to disc 115, all in such compensating relation as to tend to equalize the wear on the brake linings 114 and 121 carried by plate 103.

Accordingly, the advantages of equalized lining wear and ease of their replacement can now be combined in a simple structure with the advantage of automatic compensation of the auxiliary mechanically responsive braking mechanism, as described.

We claim:

1. In a disc brake, the combination comprising
    a. a plunger element and cylinder assembly, the plunger element being responsive to fluid pressure application to advance in one direction relative to the cylinder to transmit actuating force for displacing a brake part into braking engagement with a relatively rotating disc, the brake part being subject to wear, and
    b. auxiliary means to mechanically advance the plunger element relative to the cylinder to displace said part into braking engagement with the disc, said auxiliary means including a subplunger element projecting coaxially within a bore formed by the plunger element, the end of the subplunger element within the bore defining a piston face,
    c. there being axially spaced flanges on one of said elements and projecting generally radially proximate the subplunger element periphery, and there being split ring structure carried by and protruding from grooving formed by the other element proximate the plunger element bore so that the split ring structure cams over successive flanges as the plunger element is advanced in said one direction relative to the subplunger element, the split ring structure being engageable with said flanges to block retraction of the plunger relatively toward the subplunger, and
    d. there being fluid pressure passage means extending adjacent said split ring structure and flanges to communicate said fluid pressure for application against said subplunger piston face acting to resist subplunger movement with the plunger in said one direction.

2. The combination of claim 1 wherein said flanges are on the subplunger and said grooving is formed by the plunger element.

3. The combination of claim 2 wherein there are at least two split rings carried by the plunger element and axially spaced by an amount different from the spacing of the flanges on said subplunger element, whereby the rings alternately engage the flanges.

4. The combination of claim 3 in which said passage means is defined by an axial passage sunk in the plunger element bore.

5. The combination of claim 3 wherein said flanges have cam surfaces operable upon advancement of the plunger element relative to the subplunger element to deform and tension said ring structure.

6. The combination of claim 1 including said brake part.

7. The combination of claim 1 including another assembly including a pair of support members retained against relative separation while being free for relative shifting in a lateral direction, at least one of said members having an opening therethrough, and a pair of braking parts having laterally spaced apart opposed surfaces for clamping engagement with opposite faces of a disc received therebetween, at least one of said parts projection through said opening and said parts being carried by said other assembly for relative lateral guided movement while being retained against separation from said other assembly, and said plunger being operatively connected to one of said brake parts.

8. The combination of claim 7 wherein one member comprises a carrier plate carrying said brake parts, said plate also carrying said plunger and cylinder assembly.